United States Patent
Ghezel-Ayagh et al.

(10) Patent No.: US 11,362,360 B2
(45) Date of Patent: Jun. 14, 2022

(54) IN-SITU MONITORING OF FLUE GAS CONTAMINANTS FOR FUEL CELL SYSTEMS

(71) Applicant: FuelCell Energy, Inc., Danbury, CT (US)

(72) Inventors: Hossein Ghezel-Ayagh, New Milford, CT (US); Stephen Jolly, Southington, CT (US)

(73) Assignee: FuelCell Energy, Inc., Danbury, CT (US)

( * ) Notice: Subject to any disclaimer, the term of this patent is extended or adjusted under 35 U.S.C. 154(b) by 151 days.

(21) Appl. No.: 16/094,999

(22) PCT Filed: Apr. 21, 2017

(86) PCT No.: PCT/US2017/028844
§ 371 (c)(1),
(2) Date: Oct. 19, 2018

(87) PCT Pub. No.: WO2017/184983
PCT Pub. Date: Oct. 26, 2017

(65) Prior Publication Data
US 2019/0157696 A1     May 23, 2019

Related U.S. Application Data

(60) Provisional application No. 62/326,505, filed on Apr. 22, 2016.

(51) Int. Cl.
*H01M 8/0668* (2016.01)
*H01M 8/04992* (2016.01)
(Continued)

(52) U.S. Cl.
CPC .......... *H01M 8/0668* (2013.01); *B01D 53/30* (2013.01); *B01D 53/326* (2013.01); *F23J 15/02* (2013.01);
(Continued)

(58) Field of Classification Search
CPC ............ H01M 8/0668; H01M 8/0662; H01M 8/04447; F23J 15/02; F23J 15/022; F23J 15/025; B01D 53/30; Y02E 60/50
See application file for complete search history.

(56) References Cited

U.S. PATENT DOCUMENTS 5,505,766 A    4/1996   Chang
7,060,382 B2   6/2006   Jahnke et al.
(Continued)

FOREIGN PATENT DOCUMENTS

JP    2007-018907 A    1/2007
JP    2008-507113 A    3/2008
(Continued)

OTHER PUBLICATIONS

Jolly, Seven; Ghezel-Ayagh, Hossein; William, Carl; Patel, Dilip; DiNitto, Matthew; Marina, Olga; Pedersen, Larry; and, Steen, William; Novel Application of Carbonate Fuel Cell for Capturing Carbon Dioxide from Flue Gas Streams; EOS Transactions, 65(1) 115-127 (2015) (Year: 2015).*
(Continued)

*Primary Examiner* — Ula C Ruddock
*Assistant Examiner* — Thomas H. Parsons
(74) *Attorney, Agent, or Firm* — Foley & Lardner LLP

(57) ABSTRACT

A power production system includes a fuel cell separation system configured to receive a flue gas and to produce electrical power therefrom; a flue gas polishing system positioned upstream of the fuel cell separation system and configured to remove contaminants in the flue gas; a flue gas
(Continued)

analyzer configured to measure in real-time an amount of the contaminants in the flue gas; and a plant control system operatively coupled to the flue gas polishing system, the flue gas analyzer, and the fuel cell separation system and configured to adjust operational parameters of the flue gas polishing system.

10 Claims, 5 Drawing Sheets

(51) Int. Cl.
    *F23J 15/02*     (2006.01)
    *H01M 8/04858*     (2016.01)
    *B01D 53/32*     (2006.01)
    *H01M 8/14*     (2006.01)
    *H01M 8/04664*     (2016.01)
    *B01D 53/30*     (2006.01)
    *H01M 8/04955*     (2016.01)
    *H01M 8/0662*     (2016.01)
    *H01M 8/0444*     (2016.01)
    *H01M 8/0637*     (2016.01)
    *B01D 53/00*     (2006.01)

(52) U.S. Cl.
    CPC ....... *H01M 8/0444* (2013.01); *H01M 8/0491* (2013.01); *H01M 8/04686* (2013.01); *H01M 8/04955* (2013.01); *H01M 8/04992* (2013.01); *H01M 8/0637* (2013.01); *H01M 8/0662* (2013.01); *H01M 8/145* (2013.01); *B01D 53/002* (2013.01); *B01D 2257/504* (2013.01); *H01M 2008/147* (2013.01); *Y02E 60/50* (2013.01)

(56) References Cited

U.S. PATENT DOCUMENTS

| | | | |
|---|---|---|---|
| 8,277,545 B2 | 10/2012 | Lindau | |
| 8,329,345 B2* | 12/2012 | Koda | ................ H01M 8/04022 429/400 |
| 10,283,793 B2 | 5/2019 | Yun et al. | |
| 2005/0123810 A1* | 6/2005 | Balan | .................. H01M 8/0612 429/411 |
| 2005/0271914 A1 | 12/2005 | Farooque et al. | |
| 2007/0231634 A1 | 10/2007 | Furukawa et al. | |
| 2007/0243108 A1* | 10/2007 | Israelson | .............. G01N 21/783 422/88 |
| 2008/0241611 A1 | 10/2008 | Yoon et al. | |
| 2009/0029208 A1* | 1/2009 | Katikaneni | ....... H01M 8/04447 429/410 |
| 2009/0214902 A1 | 8/2009 | Pelman et al. | |
| 2014/0079615 A1 | 3/2014 | Honjo et al. | |
| 2014/0248545 A1 | 9/2014 | Takahashi et al. | |
| 2014/0272613 A1 | 9/2014 | Berlowitz et al. | |

FOREIGN PATENT DOCUMENTS

| | | |
|---|---|---|
| JP | 2009-240881 A | 10/2009 |
| JP | 2010-015355 A | 1/2010 |
| KR | 1020100044828 | 4/2010 |
| KR | 10201400855037 | 7/2014 |
| WO | WO-2009/014822 | 1/2009 |
| WO | WO-2011/077224 A1 | 6/2011 |
| WO | WO-2011/077224 A8 | 6/2011 |
| WO | WO-2014/041980 A1 | 8/2013 |

OTHER PUBLICATIONS

Extended European Search Report in EP17786720.7 dated Apr. 24, 2019 (9 pages).

International Search Report and Written Opinion for PCT/US2017/028844 dated Jul. 12, 2017 (14 pages).

Office Action dated Jan. 20, 2020 in JP 2018-554746, with English translation (13 pages).

Notice of Preliminary Rejection in KR 10-2018-7033319 dated Apr. 17, 2020, with English translation (12 pages).

* cited by examiner

IN-SITU MONITORING OF FLUE GAS CONTAMINANTS FOR FUEL CELL SYSTEMS

CROSS-REFERENCE TO RELATED PATENT APPLICATION

This application is a U.S. National Phase application under 35 U.S.C. § 371 of International Patent Application No. PCT/US2017/028844, filed Apr. 21, 2017, which claims the benefit of U.S. Provisional Patent Application No. 62/326,505, filed Apr. 22, 2016, the entire disclosures of which are hereby incorporated by reference in their entireties.

BACKGROUND

The present disclosure relates to fuel cell power production systems. More specifically, the present disclosure relates to in-situ monitoring of flue gas contaminants for fuel cell systems.

A fuel cell is a device which directly converts chemical energy stored in a fuel into electrical energy through electrochemical reactions. Generally, a fuel cell comprises an anode and a cathode separated by an electrolyte, which serves to conduct electrically charged ions. Fuel cells may include Molten Carbonate Fuel Cells (MCFCs) that operate by passing a reactant fuel gas through the anode, while oxidizing gas, such as carbon dioxide and oxygen, is passed through the cathode. Combustion-based power plants produce energy by combusting flammable hydrocarbon based fuels including coal, natural gas, biomass, biogas, and syngas.

As a result of the combustion process, combustion-based power plants generate flue gas, which is often disposed of by atmospheric emissions. Such emissions, however, are harmful to the environment because they contain carbon dioxide ($CO_2$) which contributes to global climate change. Increasing national and international regulations are placing strict regulations on the amount of $CO_2$ which may be released to the environment by such power generation systems.

Accordingly, a number of approaches have been used to control or limit carbon dioxide emissions from combustion-based power plants. However, separating the carbon dioxide from the post-combustion flue gas may not be cost effective because of the significant loss of energy (power and/or heat) as the result of application of carbon dioxide capture systems. The flue gas including the carbon dioxide may be provided to an electrochemical fuel cell which may include a cathode, an anode and an electrolyte, for concentrating the carbon dioxide included in the exhaust gas.

In some instances, the flue gas provided to a fuel cell, for example, an MCFC may include contaminants that can damage the fuel cell. For example, certain contaminants found in coal-derived flue gases pose the greatest risk to the MCFC. Coal-derived flue gases are generally subjected to deep polishing i.e., cleaning to remove these contaminants. Contaminants of interest include sulfur oxides, selenium-containing species (and similar beryllium-species), particulate matter, mercury species (e.g. Hg, HgO, $HgCl_2$), and halogen (e.g. Cl, Fl, Br, I) species. Natural gas-derived flue gases may contain significantly lower levels of contaminants than coal, but may still include significant amount of SOx species (e.g. $SO_2$ and $SO_3$) sufficient to damage downstream fuel cells.

It would be advantageous to provide improved systems and methods for monitoring levels of contaminants in flue gases for fuel cell systems that overcome the foregoing challenges. These and other advantageous features will be apparent to those reviewing the present disclosure.

SUMMARY

Embodiments described herein generally relate to systems and methods for monitoring levels of contaminants in a flue gas provided to a fuel cell, and in particular to systems and methods for measuring an amount of contaminants in a flue gas and adjusting operational parameters of a flue gas polishing system and/or the fuel cell based on the amount of contaminants.

In some embodiments, a power production system comprises a fuel cell separation system configured to receive a flue gas and produce electrical power therefrom. The fuel cell separation system includes a fuel cell comprising an anode section and a cathode section. The flue gas containing carbon dioxide is communicated to the cathode section of the fuel cell. The anode section produces an anode exhaust gas including carbon dioxide, hydrogen, carbon monoxide, and other gases. A flue gas polishing system is positioned upstream of the fuel cell assembly and configured to remove contaminants included in the flue gas. A flue gas analyzer is configured to measure an amount of contaminants included in the flue gas at least one of downstream of the flue gas polishing system and upstream thereof in real time. A plant control system is operatively coupled to the flue gas polishing system, the flue gas analyzer, and the fuel cell. The plant control system is configured to adjust operational parameters of the flue gas polishing system and, optionally the fuel cell based on the amount of contaminants included in the polished flue gas determined by the flue gas analyzer.

In some embodiments, in response to the level of contaminants in the flue gas exceeding a predetermined threshold, the plant control system is configured to take at least one corrective action so as to protect the fuel cell included in the fuel cell separation system receiving the flue gas.

In some embodiments, the fuel cell is an internal reforming MCFC, while in other embodiments the fuel cell is an external reforming MCFC.

In some embodiments, the flue gas includes carbon dioxide and oxygen output by a fossil fueled installation. In some embodiments, the fuel cell separation system further includes a gas separation assembly. An anode exhaust gas produced by the fuel cell may be communicated to the gas separation assembly. The gas separation assembly may include water removal systems, compressors, and/or chillers configured to separate and sequester carbon dioxide from the anode exhaust gas.

In one embodiment, a power production system comprises: a fuel cell separation system configured to receive a flue gas and to produce electrical power therefrom; a flue gas polishing system positioned upstream of the fuel cell separation system and configured to remove contaminants in the flue gas; a flue gas analyzer configured to measure in real-time an amount of the contaminants in the flue gas; and a plant control system operatively coupled to the flue gas polishing system, the flue gas analyzer, and the fuel cell separation system and configured to adjust operational parameters of the flue gas polishing system.

In one aspect of this embodiment, the flue gas analyzer is configured to measure the amount of the contaminants at a location upstream of the flue gas polishing system.

In one aspect of this embodiment, the flue gas analyzer is configured to measure the amount of the contaminants at a location downstream of the flue gas polishing system.

In one aspect of this embodiment, the flue gas analyzer is configured to measure the amount of the contaminants at locations upstream and downstream of the flue gas polishing system.

In one aspect of this embodiment, the fuel cell separation system comprises a fuel cell having an anode section and a cathode section, and the flue gas contains carbon dioxide and is received by the cathode section.

In one aspect of this embodiment, the anode section produces an anode exhaust gas comprising carbon dioxide, hydrogen, and carbon monoxide.

In one aspect of this embodiment, the plant control system is configured to adjust operational parameters of the fuel cell separation system based on the amount of contaminants in flue gas after processing in the flue gas polishing system.

In one aspect of this embodiment, the plant control system is configured to take at least one corrective action when the amount of contaminants included in the flue gas exceeds a predetermined threshold.

In one aspect of this embodiment, the corrective action comprises at least one of a visual warning, an audible warning, lowering an amount of carbon dioxide captured from the flue gas, or shutting down the fuel cell separation system.

In one aspect of this embodiment, the fuel cell is an internal reforming MCFC.

In one aspect of this embodiment, the fuel cell is an external reforming MCFC.

In one aspect of this embodiment, the power production system further comprises a gas separation assembly configured to receive the anode exhaust gas.

In one aspect of this embodiment, the gas separation assembly comprises at least one of a water removal system, a compressor, or a chiller.

In one aspect of this embodiment, the gas separation assembly comprises a chiller configured to separate carbon dioxide from the anode exhaust gas.

These and other advantageous features will become apparent to those reviewing the disclosure and drawings.

DETAILED DESCRIPTION

Embodiments described herein generally relate to systems and methods for monitoring levels of contaminants in a flue gas provided to a fuel cell, and in particular to systems and methods for measuring an amount of contaminants in a flue gas and adjusting operational parameters of a flue gas polishing system and/or the fuel cell based on the amount of contaminants.

As used herein, the term "polishing" refers to any cleaning or contaminant removal process which may be used to remove contaminants from a flue gas, such as activated char treatment, wet scrubbing, filtration, desulfurization, etc.

Figure 1A:
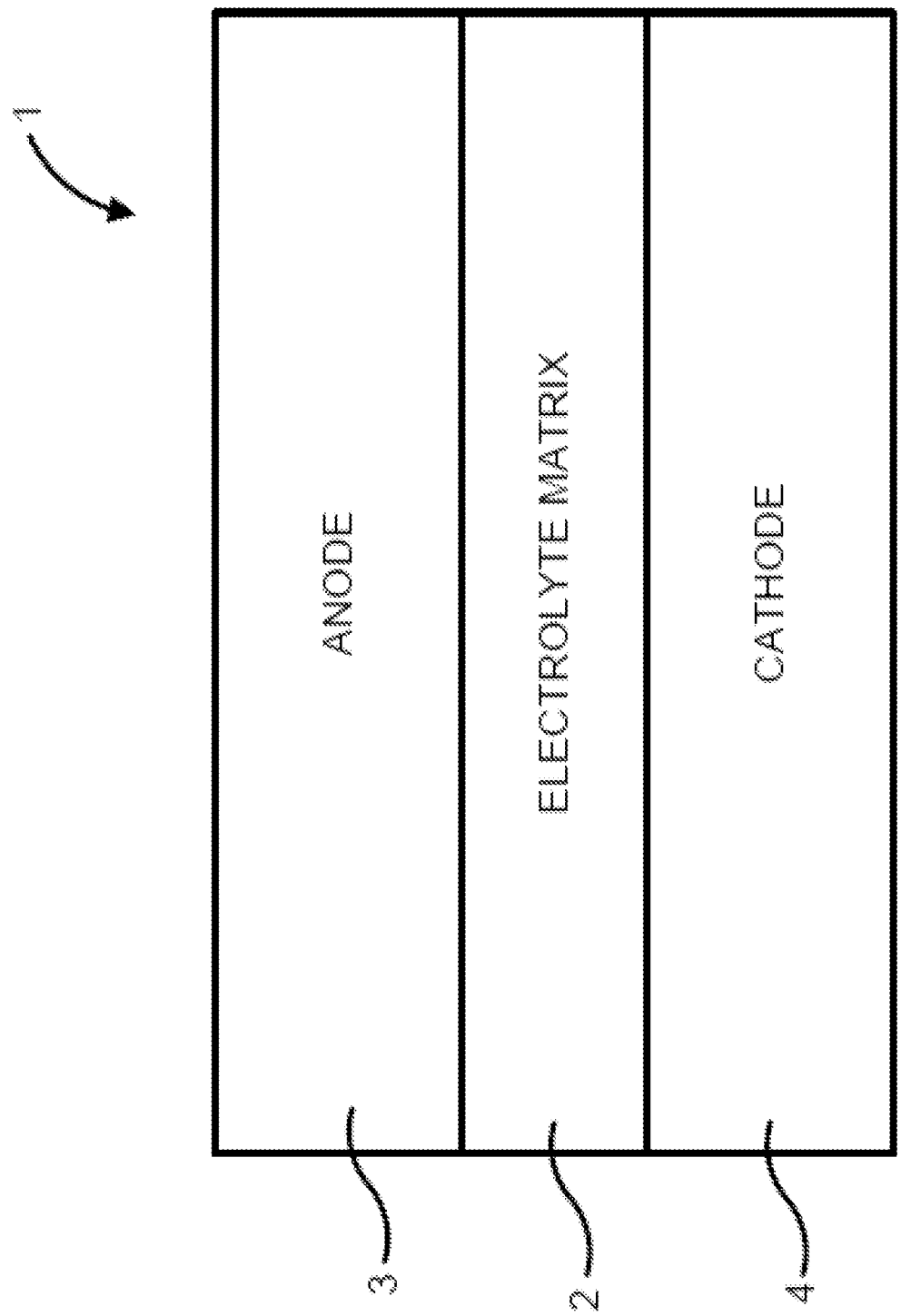
FIG. 1A is a schematic illustration of a fuel cell, according to an embodiment.

FIG. 1A is a schematic illustration of a fuel cell 1. The fuel cell 1 comprises an electrolyte matrix 2, an anode 3, and a cathode 4. The anode 3 and the cathode 4 are separated from one another by an electrolyte matrix 2. Flue gas from a flue gas-generating system (e.g., a combustion exhaust supply unit) may be provided to the cathode 4 as oxidant gas. In the fuel cell 1, fuel gas and oxidant gas undergo an electrochemical reaction in the presence of an electrolyte (e.g., a carbonate electrolyte) present in the pores of the electrolyte matrix 2. In some embodiments, the fuel cell 1 may comprise one or more fuel cell stack assembly(s) in which multiple individual fuel cells 1 are stacked and connected in series.

Figure 1B:
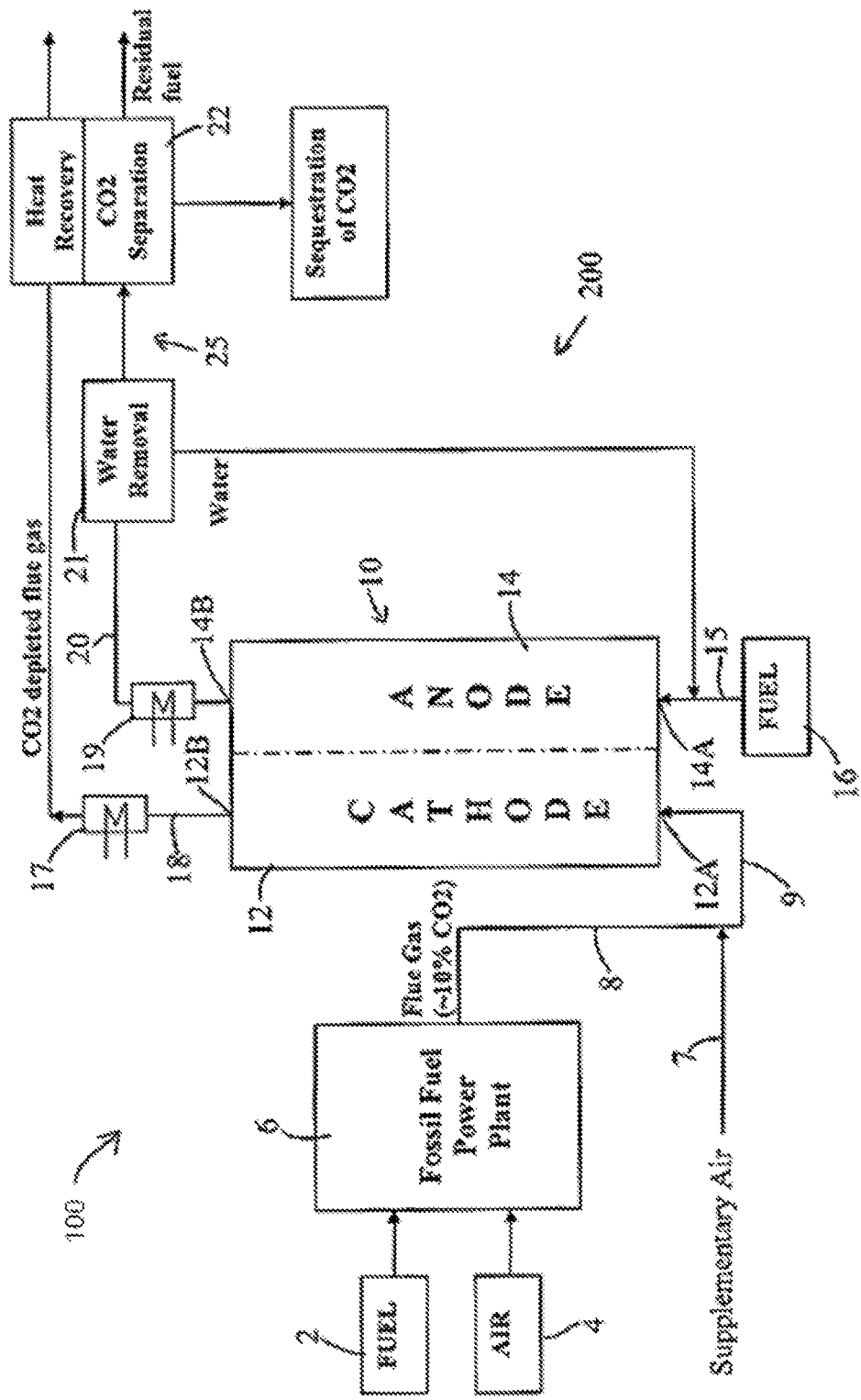
FIG. 1B is a schematic illustration of a power production system, according to an embodiment.

FIG. 1B is a schematic illustration of an integrated power production system 100 according to an embodiment. The power production system 100 comprises a flue gas generating assembly 6, which may include one or more of a fossil fueled installation, facility or device, a boiler, a combustor, and/or a furnace and kiln in a cement factory (hereinafter "fossil fueled installation, facility or device"). The flue gas generating assembly may be configured to burn a fossil fuel (e.g., coal, natural gas, gasoline, diesel, etc.) and produce a flue gas including carbon dioxide.

The power production system 100 includes a fuel cell assembly 10 (e.g., a carbonate fuel cell assembly) fluidly coupled to the flue gas generating assembly 6 and configured to receive the flue gas therefrom. The power production system 100 also includes a power producing gas separation and sequestration system 200 that includes a carbonate fuel cell assembly 10 and a gas separation assembly 25 in accordance with the disclosure. As shown in FIG. 1B, the fuel cell assembly 10 includes a cathode section 12 and an anode section 14. In some embodiments, the fuel cell assembly 10 may include an internally reforming or a direct MCFC assembly in which the fuel for the anode is internally reformed in the assembly. In other embodiments, the fuel cell assembly 10 may include an externally reforming carbonate fuel cell assembly, in which case a reformer would be used to reform the fuel prior to delivery to the fuel cell anode section.

The flue gas generation assembly 6 and the fuel cell assembly 10 of the power producing gas separation and sequestration system 200 may be arranged in tandem as shown in FIG. 1B such that the cathode section 12 of the fuel cell assembly 10 is supplied with the flue gas from the flue gas generation assembly 6. In some embodiments, the flue gas from the flue gas generation assembly is supplied exclusively to the cathode section 12. For example, fossil fuel such as coal, natural gas or other hydrocarbon fuel is delivered to the fossil fueled installation, facility or device 6 from a fossil fuel supply 2 along with air delivered from an air supply 4. The fossil fuel and air may undergo a combustion reaction in the flue generation device 6, producing power and resulting in an output flue gas exhaust. The flue gas exhaust may comprise approximately 3-20% carbon dioxide, 10-20% water, and 2-15% oxygen, with the balance being nitrogen. The exact amounts of these components depend upon the type of fossil fuel and the amount of air from the air supply 4. The oxygen content can be varied by adjusting the air supply 4 or by addition of supplementary air 7 to the flue gas 8 before entering into the fuel cell cathode section 12. The supplementary air may be used to increase the oxygen portion of the combined stream 9, in case there is not sufficient oxygen in the flue gas 8 required for the fuel cell operation.

As shown in FIG. 1B, a line 9 fluidly couples a part or all of the flue exhaust gas to the inlet 12A of the cathode section 12 so that the flue gas or oxidant gas supply to the cathode inlet 12A includes the flue gas exhaust. In some embodiments, the flue gas in combination with a possible supplementary air stream is the exclusive oxidant gas supply to the cathode inlet 12A. At the same time, fuel from a supply 16, such as coal-derived syngas, natural gas or other hydrogen-containing fuel, is delivered over a line 15 to an inlet 14A of the anode section 14. In the fuel cell assembly 10, the oxidant gas in the cathode section 12 comprising flue gas exhaust and the hydrogen, produced from fuel reformation, in the anode section 14 undergo an electrochemical reaction to produce a power output. Also, this electrochemical reaction results in a substantial portion (approximately 65% or more) of the carbon dioxide in the flue gas being transferred from the cathode section 12 to the anode section 14 of the fuel cell 10.

Expanding further, the carbon dioxide and oxygen in the flue gas react in the cathode section 12 of the fuel cell assembly 10 to produce carbonate ions which are carried to the anode section 14 of the fuel cell 10 through the fuel cell electrolyte. At the anode section 14, the carbonate ions are reduced with hydrogen from the fuel to produce water and carbon dioxide. The net result is the above-mentioned transfer of a substantial portion of the carbon dioxide in the flue gas from the cathode section 12 to the anode section 14. Anode exhaust gas at the outlet 14B of the anode section 14 of the fuel cell 10 is thus high in concentration of carbon dioxide, thereby permitting the carbon dioxide gas to be more easily and efficiently captured and sequestered using the $CO_2$ separation and sequestration systems. In some embodiments, a concentration of carbon diode in the anode exhaust gas is in the range of 60-80 mole % (dry basis), inclusive of all ranges and values therebetween.

In the embodiment shown in FIG. 1B, flue gas depleted of carbon dioxide exits the cathode section 12 through a cathode outlet 12B via a line 18. Additionally, anode exhaust gas containing predominantly carbon dioxide as well as unreacted hydrogen, carbon monoxide, water vapor, and trace amounts of other gases exits the anode outlet 14B and is conveyed by line 20 to the gas separation assembly 25. In some embodiments, the gas separation assembly 25 includes a water removal assembly 21 for recovering water from the anode exhaust and a carbon dioxide separation assembly 22 for separating carbon dioxide from the remaining anode exhaust gas. Residual fuel remaining in the anode exhaust after passing through the $CO_2$ separation assembly 22 may be recycled to the fuel cell anode 14, or transported to a point of use. Moreover, because the cathode gas exits the fuel cell assembly 10 at high temperature, all or part of the heat from this stream may be recovered by one or more heat recovery units 17 and may be used for pre-heating gases incoming into the fuel cell assembly 10. In some embodiments, heat may be recovered from the anode exhaust gas exiting the fuel cell anode section 14 prior to being conveyed to the gas separation assembly 25.

In some instances, the flue gas provided to a fuel cell, for example an MCFC, may include contaminants that can damage the fuel cell. For example, certain contaminants found in coal-derived flue gases pose the greatest risk to the fuel cell. Coal-derived flue gases can be subjected to deep polishing (i.e., cleaning to remove these contaminants). Contaminants of interest include sulfur dioxide, sulfur trioxide (SOx gases) selenium-containing species (and similar beryllium-species), particulate matter, mercury species (e.g. Hg, HgO, $HgCl_2$), and halogen (e.g. Cl, Fl, Br, I) species.

Natural gas-derived flue gases may contain significantly lower levels of contaminants than coal, but the lower level of contaminants may still be sufficient to damage downstream fuel cells. Moreover natural gas may include a significant amount of SOx gases sufficient to damage the fuel cell. In some embodiments, power production systems comprising fuel cells include flue gas cleaning or polishing systems configured to remove contaminants included in the flue gas.

Figure 2:
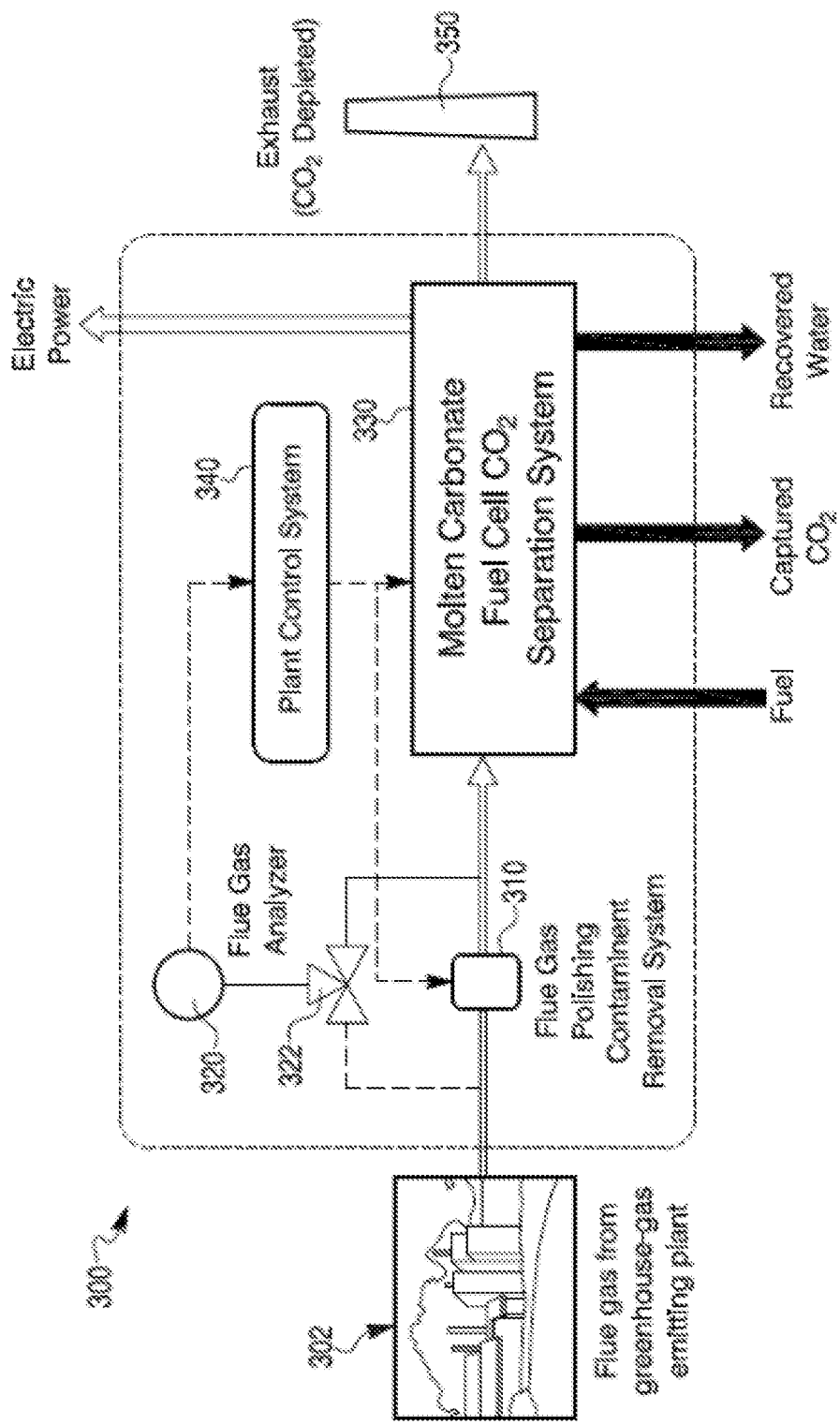
FIG. 2 is a schematic illustration of a power production system according to an embodiment.

For example, FIG. 2 is a schematic illustration of a power production system 300 that is configured to receive flue gas produced by a flue gas generating system 302 (e.g., a coal fired power plant, natural gas fired power plant, diesel fired power plant, a boiler, a combustor, a furnace and kiln in a cement factory, etc.). The power production system 300 includes a fuel cell separation system 330. The fuel cell separation system 330 may include a fuel cell, for example the fuel cell 1/10 configured to receive the flue gas from the flue gas generation system 302 as well as fuel, as described herein.

The flue gas undergoes an electrochemical reaction in the cathode section of the fuel cell separation system 330 so as to produce an anode exhaust gas which may include hydrogen, carbon monoxide, carbon dioxide, and/or water as previously described herein. The fuel cell separation system 300 may also include a gas separation assembly configured to separate and sequester carbon dioxide from the anode exhaust gas. The gas separation assembly may include a water removal system, compressors, chillers (e.g., absorption chillers), heat exchangers and/or any other components structured to efficiently separate and sequester carbon dioxide from the anode exhaust gas produced by the fuel cell, as previously described herein. The cathode exhaust gas depleted of carbon dioxide may then be vented to the environment via stack 350. Residual fuel separated from the anode exhaust gas may be recycled internally within the fuel cell separation system 330 or transported to a point of use.

A flue gas polishing system 310 is positioned upstream of the fuel cell separation system 330. The flue gas polishing system 310 is configured to polish the flue gas so as to remove contaminants (e.g., halogens, selenium, beryllium, SOx gases, particulate matter (PM), mercury species etc.) therefrom, which may damage the fuel cell included in the fuel cell separation system 330. The flue gas polishing system 310 may include any suitable components or assemblies for polishing the flue gas, including but not limited to wet scrubbers (e.g. limestone-based and caustic-based), solid adsorbents (e.g. fixed bed, dry injection, moving bed, supported on filtration media, activated char, etc.), and filtration (venturis, electrostatic precipitators, baghouses, filters, etc.).

The performance (e.g., contaminant removal efficiency) of the flue gas polishing system 310 depends on the type and amount of contaminants included in the exhaust gas. For example, coal flue gas may include halogens, selenium, beryllium and/or SOx gases but natural gas flue gas may primarily include SOx gases. The operational parameters of the flue gas polishing system 310 may be varied so as to optimize the performance of the flue gas polishing system 310, as described herein.

The power production system 300 also includes a flue gas analyzer 320 configured to measure an amount of contaminants included in the flue gas at least one of downstream and upstream of the flue gas polishing system 310. In one embodiment, a valve 322 (e.g., a three way valve) may be fluidly coupled to flue gas communication conduits located upstream and downstream of the flue gas polishing system 310. The valve 322 may be configured to selectively communicate a sample of the flue gas from downstream, and optionally upstream of the flue gas polishing system 310 to the flue gas analyzer 320. The upstream sample of the flue gas provides information on the level of contaminants in the flue gas emitted by the flue gas generating system 302, and the downstream sample of the flue gas provides information on reduction in the level of contaminants in the flue gas after passing through the flue gas polishing system 310. The level of contaminants in the downstream and upstream flue gas samples may be used to determine a performance (e.g., a contaminant removal efficiency) of the flue gas polishing system 310.

The flue gas analyzer 320 may include a high-accuracy in-situ analytical instrument (e.g., a process mass spectrometer/gas chromatograph, ultraviolet-fluorescence detector, real-time dust monitors, etc.) configured to measure amounts of critical flue gas contaminants, for example SOx gases, halogens, selenium, beryllium, etc. The flue gas polishing system 310 performance is thereby monitored in nearly real time by the flue gas analyzer 320. The flue gas analyzer 320 is configured to detect contaminants of interest included in the flue gas based on the type of flue gas communicated to the power production system 300. For example, in natural-gas derived flue gas applications, the flue gas analyzer 320 may be operative to measure an amount of SOx gases only. On the contrary, for coal-derived flue gas applications, the flue gas analyzer 320 may be operative to measure an amount of SOx gases in addition to halogens (Cl, Fl, I, Br) and other contaminants of interest (e.g., Se, Be, PM etc.).

The flue gas analyzer 320 may generate a feedback signal indicative of the amount of contaminants included in the exhaust gas downstream and/or upstream of the flue gas polishing system 310. The feedback signal may be communicated to a plant control system 340 configured to control the operations of the power production system 100. The plant control system 340 may comprise any suitable controller, for example the computing device 630.

The plant control system 340 may comprise a processor, for example a microprocessor, programmable logic controller (PLC), an ASIC chip, or any other suitable processor. The processor may be in communication with a memory, for example a non-transitory computer readable medium such as a random access memory (RAM), a hard disk or any other storage device. The processor may be configured to execute instructions, algorithms, commands, or other programs stored in the memory. The plant control system 340 may also include a sensor configured to sense one or more signals, for example the feedback signal from the flue gas analyzer 320, and a transceiver configured to transmit an operational signal to at least one of the flue gas polishing system 310 and the fuel cell separation system 330.

The plant control system 340 is operatively coupled to the flue gas polishing system 310 and the fuel cell separation system 330, and configured to adjust at least one operational parameter of the flue gas polishing system 320 so as enhance a performance thereof based on information provided by the feedback signal. For example, in embodiments in which the flue gas polishing system 310 includes a wet scrubbing system, the plant control system 340 can increase a circulation rate of a scrubbing fluid and/or a blowdown frequency in response to an increase in the amount of contaminants in the flue gas exiting the flue gas polishing system 310.

In some embodiments, the plant control system 340 may also be configured to determine if the amount of contaminants or contaminant level in the flue gas exiting the flue gas polishing system 320 or the polished flue gas exceeds a predetermined threshold. In response to the polished flue gas exceeding the predetermined threshold, the plant control system 340 may take at least one corrective action so as to protect a fuel cell receiving the flue gas. For example, if the amount of contaminants in the polished flue gas exceeds a first predetermined threshold, the plant control system 340 may provide a notification to a user, for example light a warning lamp, issue an audible or visual warning and/or activate an alarm, or lower the amount of $CO_2$ captured from the flue gas by adjusting a fuel cell current density of the fuel cell included the fuel cell separation system 330. Furthermore, if the amount of contaminants in the exhaust gas exceeds a second predetermined threshold higher than the first predetermined threshold, the plant control system 340 may shutdown the fuel cell separation system 330 (e.g., the fuel cell such as a MCFC fuel cell included in the fuel cell separation system 330).

Figure 3:
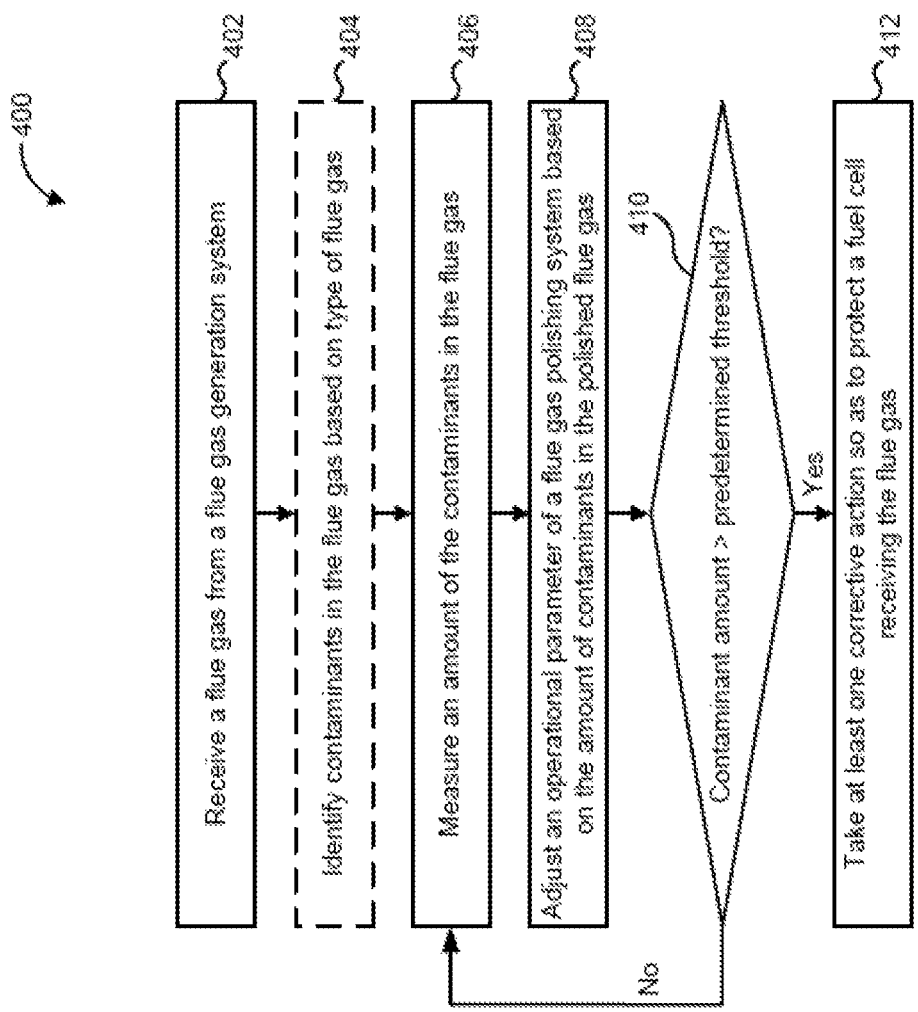
FIG. 3 is a schematic flow diagram of an example method of monitoring level of contaminants in a flue gas and controlling operations of a power production system, according to an embodiment.

FIG. 3 is a schematic flow diagram of an example method 400 for operating a power generation system (e.g., the power generation system 300). The method 400 includes receiving a flue gas from a flue gas generation system 402, for example the flue gas generation system 6/302. In some embodiments, contaminants included in the flue gas are identified based on the type of flue gas at 404. For example, the flue gas analyzer 320 may identify the type of contaminants expected to be included in the flue gas based on whether the flue gas is coal flue gas or a natural gas flue gas, as previously described herein.

An amount of contaminants included in the flue gas is measured at 406. For example the flue gas analyzer 320 measures the amount of contaminants included in the flue gas downstream of the flue gas polishing system 310, and optionally upstream thereof.

An operational parameter of a flue gas polishing system is adjusted based on the amount of contaminants included the polished flue gas at 408. For example, the plant control system 340 may adjust one or more operational parameters of the flue gas polishing system 310 based on an amount of contaminants included in the polished flue gas indicated by the feedback signal of the flue gas analyzer 320. In some embodiments, the plant control system 340 may adjust the one or more operational parameters of the flue gas polishing system 320 based on a performance metric (e.g., a contaminant removal efficiency or inefficiency) of the flue gas polishing system 310). The performance metric may be determined from the amount of contaminants in the flue gas downstream and upstream of the flue gas polishing system 310, for example via a ratio thereof.

It is determined if the contaminant amount exceeds a predetermined threshold at 410. The predetermined threshold may be static (i.e., an absolute number) or dynamic (e.g., varying in correspondence with an operating condition of the flue gas generating system 302 and/or the power generating system 300. In response to the contaminant amount exceeding the predetermined threshold, at least one corrective action is taken so as to protect a fuel cell receiving the flue gas at 412. For example, if the amount of contaminants in the polished flue gas exceeds a first predetermined threshold, the plant control system 340 may provide a notification to a user, for example light a warning lamp, issue an audible or visual warning and/or activate an alarm, or lower the amount of $CO_2$ captured from the flue gas by adjusting the fuel cell current density of the fuel cell included in the fuel cell separation system 330. Furthermore, if the amount of contaminants in the exhaust gas exceeds a second predetermined threshold (e.g. 1 ppm SOx, 10 ppb Se or Be, 200 ppv HCl, 250 ppb Hg), higher than the first predetermined threshold, the plant control system 340 may shutdown the fuel cell separation system 330 (e.g., the fuel cell such as a MCFC fuel cell included in the fuel cell separation system 330).

Figure 4:
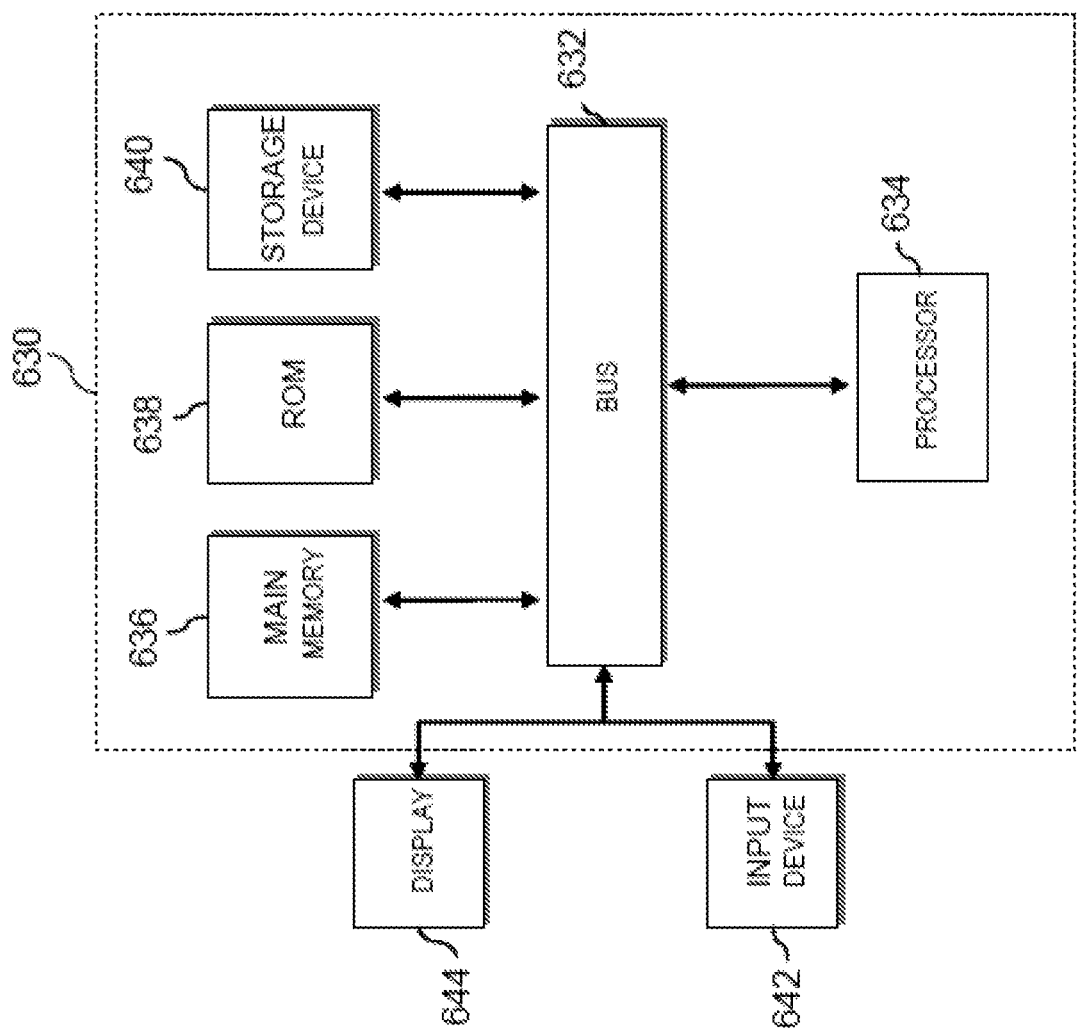
FIG. 4 is a schematic block diagram of a computing device which may be used as the plant control system of FIG. 2, according to an embodiment.

In some embodiments, the plant control system 340 or any of the controller or control circuitries described herein can comprise a system computer of a power production system 300 (e.g., a fuel cell based power generation system). For example, FIG. 4 is a block diagram of a computing device 630 in accordance with an illustrative implementation. The computing device 630 can be used to perform any of the methods or the processes described herein, for example the method 400. In some embodiments, the plant control system 340 may include the computing device 630. The computing device 630 includes a bus 632 or other communication component for communicating information. The computing device 630 can also include one or more processors 634 or processing circuits coupled to the bus 632 for processing information.

The computing device 630 also includes main memory 636, such as a random access memory (RAM) or other dynamic storage device, coupled to the bus 632 for storing information, and instructions to be executed by the processor 634. Main memory 636 can also be used for storing position information, temporary variables, or other intermediate information during execution of instructions by the processor 634. The computing device 630 may further include ROM 638 or other static storage device coupled to the bus 632 for storing static information and instructions for the processor 634. A storage device 640, such as a solid-state device, magnetic disk or optical disk, is coupled to the bus 632 for persistently storing information and instructions. For example, instructions corresponding to operations of the method 400 can be stored on the storage device 640.

The computing device 630 may be coupled via the bus 632 to a display 644, such as a liquid crystal display, or active matrix display, for displaying information to a user. An input device 642, such as a keyboard or alphanumeric pad, may be coupled to the bus 632 for communicating information and command selections to the processor 634. In another implementation, the input device 642 has a touch screen display 644.

According to various implementations, the processes and methods described herein can be implemented by the computing device 630 in response to the processor 634 executing an arrangement of instructions contained in main memory 636 (e.g., the operations of the method 400). Such instructions can be read into main memory 636 from another non-transitory computer-readable medium, such as the storage device 640. Execution of the arrangement of instructions contained in main memory 636 causes the computing device 630 to perform the illustrative processes described herein. One or more processors in a multi-processing arrangement may also be employed to execute the instructions contained in main memory 636. In alternative implementations, hard-wired circuitry may be used in place of or in combination with software instructions to effect illustrative implementations. Thus, implementations are not limited to any specific combination of hardware and software.

Although an example computing device has been described in FIG. 4, implementations described in this specification can be implemented in other types of digital electronic, or in computer software, firmware, or hardware, including the structures disclosed in this specification and their structural equivalents, or in combinations of one or more of them.

Implementations described in this specification can be implemented in digital electronic, or in computer software, firmware, or hardware, including the structures disclosed in this specification and their structural equivalents, or in combinations of one or more of them. The implementations described in this specification can be implemented as one or more computer programs, i.e., one or more circuitries of computer program instructions, encoded on one or more computer storage media for execution by, or to control the operation of, data processing apparatus. A computer storage medium includes a non-transitory computer readable medium and can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuitry, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuitries, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed is:

1. A power production system comprising:
   a fuel cell separation system comprising a molten carbonate fuel cell and configured to receive a flue gas and to produce electrical power therefrom;
   a flue gas polishing system positioned upstream of the fuel cell separation system and configured to remove contaminants in the flue gas;
   a flue gas analyzer configured to receive a first sample of the flue gas from a location upstream of the flue gas polishing system, to receive a second sample of the flue gas from a location downstream of the flue gas polishing system, and to measure an amount of the contaminants in the flue gas at the location upstream of the flue gas polishing system and at the location downstream of the flue gas polishing system; and
   a plant control system operatively coupled to the flue gas polishing system, the flue gas analyzer, and the fuel cell separation system and configured to:
      calculate a contaminant removal efficiency of the flue gas polishing system as a ratio of the amount of contaminants in the second sample of the flue gas from the location downstream of the flue gas polishing system to the amount of contaminants in the first sample of the flue gas from the location upstream of the flue gas polishing system; and
      adjust operational parameters of the flue gas polishing system and a fuel cell assembly in the fuel cell separation system based on the calculated contaminant removal efficiency.

2. The power production system of claim 1, wherein:
   the fuel cell assembly in the fuel cell separation system comprises an anode section and a cathode section, and
   the cathode section is configured to receive the flue gas that contains carbon dioxide.

3. The power production system of claim 2, wherein the anode section produces an anode exhaust gas comprising carbon dioxide, hydrogen, and carbon monoxide.

4. The power production system of claim 3, further comprising a gas separation assembly configured to receive the anode exhaust gas.

5. The power production system of claim 4, wherein the gas separation assembly comprises at least one of a water removal system, a compressor, or a chiller.

6. The power production system of claim 4, wherein the gas separation assembly comprises a chiller configured to separate carbon dioxide from the anode exhaust gas.

7. The power production system of claim 2, wherein the molten carbonate fuel cell is an internal reforming MCFC.

8. The power production system of claim 2, wherein the molten carbonate fuel cell is an external reforming MCFC.

9. The power production system of claim 1, wherein the plant control system is configured to take at least one corrective action when the amount of the contaminants in the flue gas at the location downstream of the flue gas polishing system exceeds a predetermined threshold.

10. The power production system of claim 9, wherein the corrective action comprises at least one of a visual warning, an audible warning, lowering an amount of carbon dioxide captured from the flue gas, or shutting down the fuel cell separation system.

* * * * *